United States Patent [19]

Smorada et al.

[11] Patent Number: 4,961,983
[45] Date of Patent: Oct. 9, 1990

[54] PRINTABLE PAPER SUBSTITUTE BASED ON SPUNBONDED POLYPROPYLENE FABRICS

[75] Inventors: Ronald L. Smorada; George W. Logan, both of Kennett Square, Pa.

[73] Assignee: Reemay, Inc., Old Hickory, Tenn.

[21] Appl. No.: 280,031

[22] Filed: Dec. 5, 1988

[51] Int. Cl.$^5$ ............................................. B32B 3/04
[52] U.S. Cl. .................................. 428/121; 428/284; 428/226; 428/296; 428/297; 428/340; 428/343
[58] Field of Search ............... 428/284, 286, 296, 297, 428/121, 343, 340

[56] References Cited

U.S. PATENT DOCUMENTS

| | | | |
|---|---|---|---|
| 3,932,682 | 1/1976 | Loft et al. | 428/296 |
| 3,934,067 | 1/1976 | Goldman et al. | 428/296 |
| 4,051,295 | 9/1977 | Bernstein | 428/296 |
| 4,748,070 | 5/1988 | Beehler | 428/286 |
| 4,789,699 | 12/1988 | Kieffer et al. | 428/286 |

Primary Examiner—James J. Bell
Attorney, Agent, or Firm—Juettner Pyle Lloyd & Verbeck

[57] ABSTRACT

A printable paper substitute is composed of a laminated sheet having a central layer of nonwoven spunbonded polypropylene and outer layers of pigmented polypropylene. The outer layers are capable of delamination to provide evidence of tempering.

10 Claims, 1 Drawing Sheet

PRINTABLE PAPER SUBSTITUTE BASED ON SPUNBONDED POLYPROPYLENE FABRICS

BACKGROUND OF THE INVENTION

This invention relates to paper substitutes composed of nonwoven polymeric fibers or filaments and more particularly to a fabric or laminate which can be printed by conventional methods and further processed into useful items such as envelopes.

Spunbonded fabrics are distinguished from other nonwoven fabrics by an integrated and continuous manufacturing procedure comprising the steps of spinning, laydown, consolidation, and bonding of continuous filaments to form a fabric, typically a fabric having planar-isotropic properties due to the random laydown of the filaments. Some of the processes are described in U.S. Pat. Nos. 3,338,992, 3,991,244, 4,017,580, 3,502,763 and No. 4,405,297. The composition of spunbonded fabrics have included polyester, nylon, polyethylene and polypropylene.

Most spunbonded fabrics have not been proposed as paper substitutes for a variety of reasons, including difficulties in providing a variety of colors and printing on the surface of the fabric, and difficulties in processing the fabric into useful articles such as envelopes. A notable exception is spunbonded polyethylene sold under the trademark "TYVEK". These fabrics are flash spunbonded and have a filament size of in the order of 0.05 denier. As a result, the material has the appearance of a white sheet, which may be printed by conventional methods.

There are several disadvantages in the use of spunbonded polyethylene or "TYVEK"sheets as paper substitutes. The material is relatively expensive compared to paper, and more difficult to print and handle. When processed into envelopes or other similar products, the products are relatively limp, and a separate coloring or printing process must be employed to impart color to the sheet.

Another drawback with "TYVEK" envelopes is the absence of reliable security in the sealed envelope. The end flap employs an active adhesive covered by a strip of a release sheet. After sealing, the flap can be opened and re-closed without any evidence of tampering.

Other envelope materials have been proposed but have received limited acceptance. These include paper and plastic laminates and plastic film pouches.

It would be desirable to employ spunbonded polypropylene as a paper substitute. Isotactic polypropylene is the most widely used polymer for spunbonded production, and because of its low density, provides the highest yield at the lowest cost. Polypropylene fabrics also offer excellent physical properties in terms of strength, stiffness and tear resistance. One such fabric is sold under the trademark "TYPAR". The fabrics, however, are porous and cannot be printed or dyed by conventional methods. Also, the fabrics cannot be processed in conventional paper handling and processing equipment due to the fibrous surfaces. As a result, the use of such fabrics has been confined to areas such as carpet backing, furniture, bedding, and geotextiles, and none of these fabrics have been successfully converted into paper substitute products, such as envelopes.

SUMMARY OF THE INVENTION

The present invention comprises the provision of a paper substitute based on a light weight spunbonded polypropylene fabric, which can be printed by conventional methods and processed at high speed into useful forms such as envelopes using substantially standard equipment.

The spunbonded polypropylene is extrusion coated or laminated on both sides with a polymer to provide continuous, impervious outer polymeric layers or films. At least one layer preferably contains sufficient pigment to render the coated or laminated fabric substantially opaque and to provide contrast for printing. The printing surface is also corona or flame treated to partially oxidize and raise surface adhesion and energy of the surface, which enables printing by use of conventional inks. Antistat compounds are added to the outer layers, which, together with the inherent stiffness of the material, enable and facilitate processing of the material through envelope processing machinery.

It has been found that a superior synthetic paper substitute can be prepared from spunbonded polypropylene fabric having a basis weight of less than 2.5 oz. per square yard and an outer coating or laminate thickness of less than 1.5 mils./side. The resulting composite material can be processed into envelopes having a basis weight comparable to paper and paper substitutes, and properties, such as strength, permeability, tear strength and stiffness, which are comparable or superior to high quality paper stock or other paper substitutes.

The outer polymeric layers are bonded to the opposed surfaces of the spunbonded substrate but are not fused together through the substrate, such that the composite material retains fiber mobility and high resistance to tear. Also, when the flap of an envelope is sealed with an adhesive and is then opened, the composite material tends to delaminate and is a useful indication of tampering.

In the processing of the coated fabric into envelopes or similar products in which the material is to be folded, sufficient pressure is provided along the fold lines to at least partially disrupt or permanently crimp the tough and resilient filaments of the substrate, in order to obtain a permanent crease. In addition, hot melt adhesives are employed at the permanent flaps to allow rapid processing and the simulation of a high grade paper envelope.

THE DRAWING

DESCRIPTION OF THE PREFERRED EMBODIMENTS

In accordance with the present invention, the paper substitute comprises a substrate composed of spunbonded polypropylene fabric 10. The product is made by spinning a large number of filaments which are randomly deposited to form a sheet, followed by heat bonding to produce a uniform porous sheet, as described in U.S. Pat. No. 4,582,750. The basis weight of the sheet is in the order of about 1.0 to about 2.5 oz. per square yard and preferably 1.0 to 1.6 oz./yd$^2$ with a thickness of about 7.0 to about 12 mils. The filaments in the sheet are in the order of about 6 to about 10 denier.

Since the spunbonded substrate is to be used as component of a paper substitute, the basis weight of the sheet is very important in defining an acceptable product. A basis weight in excess of 2.5 oz. is too stiff and heavy to allow subsequent processing; a basis weight below one oz. is difficult to process and handle in an efficient manner.

The spunbonded substrate is then coated on both sides with a thermoplastic polymer, especially a polyolefin, and preferably polypropylene. This may be accomplished during manufacture of the spunbonded sheet by the use of a conventional melt-extrusion coating apparatus, such as that described in U.S. Pat. No. 4,684,568. The thickness of the coating or outer ply 12 and 14 is in the order of from about 0.25 to about 1.5 mils per side, and preferably 0.5 to 1.0 mil per side. In the alternative, the film may be applied to the spunbonded web as a separate step using an adhesive.

Pigments of a variety of colors may be incorporated into the molten composition to provide a resultant laminate which is substantially moisture and gas impermeable, substantially opaque and exhibits uniform color. In the case of a polypropylene coating, various conventional pigments are available and may be added in the amount of from about 3 to about 10 percent by weight or in sufficient quantities to render the sheet substantially opaque. In addition, different colors may be imparted to the respective outer polymer coatings to attain an attractive or special purpose product. This differs from materials such as spunbonded polypropylene, which are uncoated, and must be colored by a separate printing procedure.

In the alternative, the pigment may be omitted to provide a substantially transparent reinforced material. This is useful, for example, when producing envelopes or pouches in which the contents must be visible, such as with the storage of legal evidence or other specimens. In addition, a quantity of antistat agent is incorporated into the coating to facilitate later processing.

In addition to or in lieu of the foregoing coating additives, other additives may be employed. For example, anticorrosive additives may be incorporated if the material is used to package items which are subject to oxidation or corrosion. Metal powders may be added to provide static or electrical discharge for sensitive electronic components, such as printed circuit boards.

Figure 2:
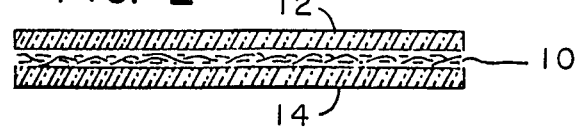
FIG. 2 is a transverse sectional view of the paper substitute of the present invention.

The coating procedure results in a three ply laminate, as shown in FIG. 2, in which the outer polymer films 12 and 14 are adhered to the spunbonded substrate 10. It is important that the outer films are not fused together through the sheet. This would result in loss of fiber mobility and would unacceptably reduce the tear strength of the sheet. Also, substantial fusion between the outer layers would reduce or eliminate the opportunity of having a tamper-proof feature, as will be hereinafter described.

Due to the inherent properties of the spunbonded polypropylene, and the presence of the outer film layers, the resultant material is tough, durable, puncture resistant, and exhibits excellent tear strength and gas and liquid impermeability. Also, the stiffness of the material is equivalent or greater than that of high quality envelope papers.

Figure 1:
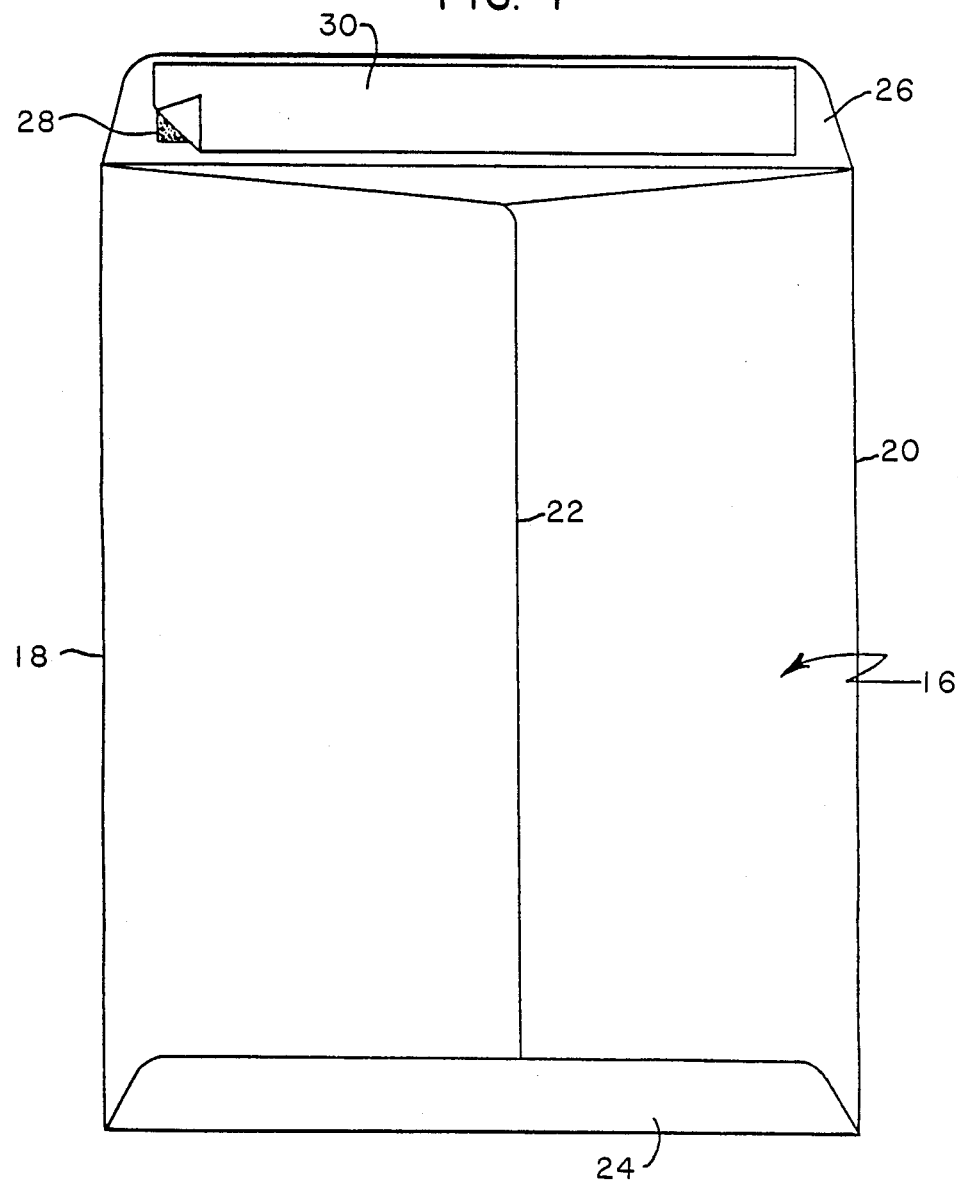
FIG. 1 is a plan view of a mailing envelope made from the paper substitute of the present invention.

As shown in FIG. 1, the paper substitute of the present invention may be processed into an envelope 16 with the use of conventional continuous processing machinery. In order to form the sheet material into envelopes, a blank is first prepared, which is then folded along the sides 18 and 20 to define a central overlapping seam 22 which is secured by an adhesive. The bottom flap 24 is then folded over and secured. Preferably, the foregoing seals are made with the use of hot melt or thermoplastic adhesives, which allow a more rapid set or hardening of the adhesive and a more rapid production rate.

The inner surface of the top flap 26 is provided with an area or strip 28 of pressure sensitive adhesive, which is covered by a strip 30 of release sheet in a conventional manner. After the desired contents have been placed in the open pouch or pocket of the envelope, the release strip 30 may be peeled away, and the top flap 26 is folded over and secured to adjoining body of the envelope to form an enclosure.

An important feature of the present invention is the ability to provide an envelope having a tamper proof feature, i.e., visible evidence that the envelope has been opened after having been closed and sealed. As stated previously, the outer film plies 12 and 14 of the sheet are not fused to each other, but only to the outer surfaces of the spunbonded sheet 10. Appropriate adhesive is selected such that the adhesive bond at the seals is stronger than the peel or delaminating strength between the film layers 12 and 14 and the central spunbonded web 10. As a result, when an attempt is made to open the envelope at any of the seals, the adhesive layer pulls off or debonds the underlying film layer of the laminate. As a result, the flap or seam cannot be resealed because the detached film layer covers the adhesive layer. Also, especially if the film layers are pigmented, opening of a flap causes the white or different color fibrous layer to be exposed.

We claim:

1. A synthetic paper substitute capable of being processed into envelopes and the like, said paper substitute comprising a substrate of nonwoven spunbonded polypropylene fabric having a basis weight of less than 2.5 oz. per square yard, and a continuous outer impermeable polymeric film layer bonded to both sides of said substrate, at least one of said layers comprising polypropylene and sufficient pigment to render said layer substantially opaque, the surface of said one layer being partially oxidized and receptive to printing.

2. The synthetic paper substitute of claim 1, wherein both of the outer layers comprise polypropylene and pigment.

3. The synthetic paper substitute of claim 1, wherein the pigment in one of the layers is a different color from the pigment in the other layers.

4. The synthetic paper substitute of claim 1, wherein each film layer has a thickness of less than 1.5 mils.

5. The synthetic paper substitute of claim 1, wherein the film layers are surface bonded to the substrate and are substantially free of fusion together through the substrate.

6. The synthetic paper substitute of claim 1 wherein said substrate of nonwoven spunbonded polypropylene fabric has a basis weight in the order of from about one to about 2.5 oz. per square yard.

7. The synthetic paper substitute of claim 6 wherein said substrate is composed of filaments having a denier of from about 6 to about 10.

8. The synthetic paper substitute of claim 1 wherein said outer film layers have a thickness in the order of from about 0.5 to about 1.5 mil per side.

9. The synthetic paper substitute of claim 5 wherein said substitute is in the form of a folded sheet having overlapping portions, means for providing an adhesive bond between said overlapping portions, said adhesive bond being stronger than the bond between said outer film layers and said substrate.

10. A synthetic paper substitute capable of being processed into envelopes and the like, said paper substitute comprising a sheet consisting essentially of a central layer of fabric of spunbonded filaments having a denier of from about 6 to about 10 and a basis weight of from about one to 2.5 oz. per square yard, and a nonporous polypropylene film layer adhered to the outer surface of each side of said central layer, said film layer having a thickness of from about 0.5 to 1.5 mil.

* * * * *